United States Patent
Malik et al.

(10) Patent No.: US 9,037,642 B2
(45) Date of Patent: May 19, 2015

(54) PLATFORM FOR DEPLOYMENT AND DISTRIBUTION OF MODULES TO ENDPOINTS

(75) Inventors: Jatin Malik, Bangalore (IN); Thomas Herchek, Blue Bell, PA (US)

(73) Assignee: Fiberlink Communications Corporation, Blue Bell, PA (US)

( * ) Notice: Subject to any disclaimer, the term of this patent is extended or adjusted under 35 U.S.C. 154(b) by 167 days.

(21) Appl. No.: 13/598,256

(22) Filed: Aug. 29, 2012

(65) Prior Publication Data

US 2013/0054682 A1 Feb. 28, 2013

Related U.S. Application Data

(60) Provisional application No. 61/528,503, filed on Aug. 29, 2011.

(51) Int. Cl.
| | |
|---|---|
| *G06F 9/445* | (2006.01) |
| *H04L 12/771* | (2013.01) |
| *H04W 4/00* | (2009.01) |
| *G06F 9/48* | (2006.01) |

(52) U.S. Cl.
CPC ............... *G06F 8/60* (2013.01); *H04L 45/563* (2013.01); *H04W 4/001* (2013.01); *G06F 9/4862* (2013.01)

(58) Field of Classification Search
None
See application file for complete search history.

(56) References Cited

U.S. PATENT DOCUMENTS

| | | | | |
|---|---|---|---|---|
| 6,701,366 B1 * | 3/2004 | Kallas et al. | ................... | 709/227 |
| 7,392,302 B2 * | 6/2008 | Halpern | ......................... | 709/223 |
| 7,392,317 B2 * | 6/2008 | Halpern | ......................... | 709/228 |
| 7,403,996 B2 * | 7/2008 | Halpern | ......................... | 709/228 |
| 7,694,003 B2 * | 4/2010 | Halpern | ......................... | 709/228 |
| 7,743,063 B2 * | 6/2010 | James et al. | ................... | 707/752 |
| 2002/0138659 A1 * | 9/2002 | Trabaris et al. | ................ | 709/313 |
| 2003/0084138 A1 | 5/2003 | Tavis et al. | | |
| 2003/0233433 A1 * | 12/2003 | Halpern | ......................... | 709/222 |
| 2004/0268298 A1 * | 12/2004 | Miller et al. | ................... | 717/106 |
| 2005/0132349 A1 | 6/2005 | Roberts et al. | | |
| 2005/0262189 A1 * | 11/2005 | Mamou et al. | ................ | 709/203 |
| 2007/0226323 A1 * | 9/2007 | Halpern | ......................... | 709/222 |
| 2008/0140844 A1 * | 6/2008 | Halpern | ......................... | 709/226 |
| 2009/0187970 A1 | 7/2009 | Mower et al. | | |
| 2009/0210702 A1 * | 8/2009 | Welingkar et al. | ............ | 713/156 |
| 2009/0307678 A1 | 12/2009 | Wu | | |
| 2010/0211941 A1 | 8/2010 | Roseborough | | |
| 2010/0262958 A1 | 10/2010 | Clinton et al. | | |
| 2011/0209142 A1 | 8/2011 | Wookey | | |

OTHER PUBLICATIONS

PCT/US12/052873 International Search Report dated Nov. 16, 2012.
Supplementary European Search Report mailed Dec. 4, 2014 in corresponding European Patent Application No. 12827016.2.

* cited by examiner

*Primary Examiner* — Brian P Whipple
(74) *Attorney, Agent, or Firm* — Pepper Hamilton LLP

(57) ABSTRACT

Systems and methods facilitate the deployment of software modules from a file server to agents on endpoints. Agents can contact a heartbeat server to receive information about a latest manifest file that identifies the software modules that should be installed on the endpoint. Agents can then determine from the manifest information whether new files need to be downloaded and automatically download them. A scripting engine can be used to allow run-time installation of modules without causing significant downtime of the endpoint. The scripting engine can utilize the agent to report back status and data from the software modules to allow modules to be used with a mobile device management platform.

20 Claims, 11 Drawing Sheets

Module Details

Fields suffixed by a * indicate mandatory fields.

Module Details

Code *  
Name *  
Category: MaaS360 Services  
Product Line: Desktop Management  
Independent Module ☐

Description

Start Version Details

Start Version*: 1.0  
Status: ◉ Draft  ○ GA  ○ Beta

Manifest Component*

FIG. 6A

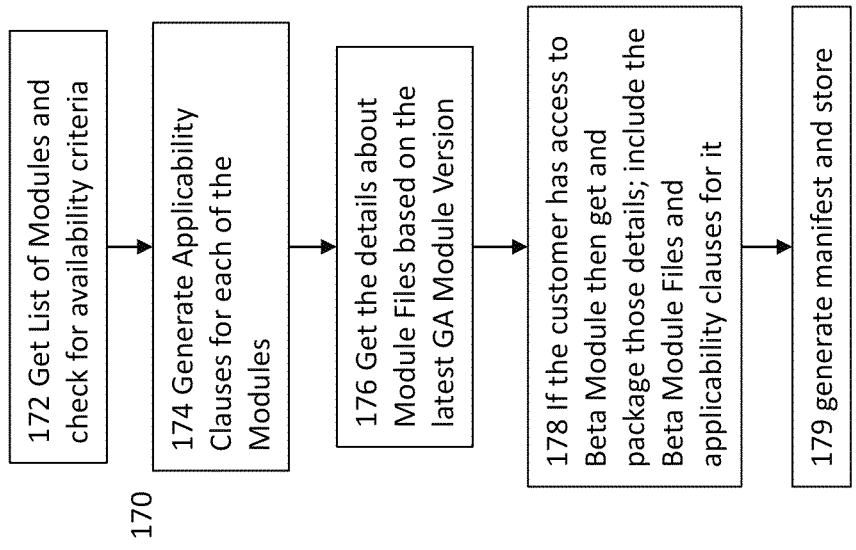

FIG. 9

```
<heartbeatresponse timestamp="number">
<license value="9438jdkjd3"/>
<urls for="download">
<url value="http://..."/>
<url value="http://..."/>
</urls>
<file name="manifest.xml" source="manifest filename"
 version=".." key="..." sha1="..." />
<groups>
<group id="..."/>
<group id="..."/>
</groups>
<users>
<user id="..." + additional attributes + >
<groups>
<group id="..."/>
<group id="..."/>
</groups>
</user>
<user id="..." + additional attributes + >
</user>
</users>
</heartbeatresponse >
```

FIG. 7

Example of Manifest File

```
<Manifest Version="1.0" AutoUpgrade="Y">
<LicenseKeys>
<LicenseKey LicenseID="0001" Key="ABCDEFGHIJKLMNOPQRSTUVWXYZ0123456789" ExpireDate="20110714">
</LicenseKey>
</LicenseKeys>
<Modules>
<Module ModuleID ="0003" Name="ACDC" Version="3.00.000" ExpireDate="20121231" MSID="0">
<Applicability><![CDATA[return 0]]></Applicability>
< ActivateScript > ACDCActivateScript.lua </ActivateScript >
< DeactivateScript >ACDCDeactivateScript.lua </DeactivateScript >
<Action ActionID="000000310" />
<Action ActionID="000000311" />
<Files>
<File Name="ACDCActivateScript.lua" Crc="30912844bb6eea082a84feec5dab27c05eea498f"
       EncCrc="12376e9f25b34cb2972c48549fc2f7576765432l" Target="" Type="Script" Key="09029895678"
       Compress="N"    Url="/scripts/cust1/ACDCActivateScript.lua"/>
</Files>
</Module>
</Modules>
<Files minCoreVersion="2.0">
<File Name="policy.pol" Crc="ba4afe9f25b34cb2972c48549fc2f7576765432l"           Target="" Type="Policy"
       EncCrc="65776e9f25b34cb2972c48549fc2f7576765432l"
       Key="3902989384 3" Compress="N Url="/policies/customer/policy.pol"/>
</Files>
</Manifest>
```

PLATFORM FOR DEPLOYMENT AND DISTRIBUTION OF MODULES TO ENDPOINTS

CROSS-REFERENCE TO RELATED APPLICATIONS

This application claims the benefit of U.S. Provisional Application Ser. No. 61/528,503 filed Aug. 29, 2011, entitled "Saas Platform for Module Development and Delivery to Endpoints," which is incorporated herein by reference in its entirety.

TECHNICAL FIELD

The present invention relates generally to methods and systems for providing mobile device management services and more specifically providing deployment services for deploying software modules to a plurality of managed endpoints.

BACKGROUND

Mobile device management (MDM) platforms typically allow organizations to control or observe access to corporate resources from mobile devices, such as laptops, tablets, or smartphones. MDM platforms may gather information about mobile devices accessing corporate resources and networks. MDM platforms may also allow organizations to control access to corporate resources based on status information or identity of users or devices. Furthermore, MDM platforms may allow an organization to restrict access to data or applications on the device. For example, a network may use a mobile device management platform to gather information about smart phones that access corporate e-mail. These devices can be restricted, such that, for example, if a user fails to confirm his identity (e.g., entering a password), e-mail apps can be blocked or stored e-mail data may be locked or wiped.

Because mobile devices change rapidly, it may be difficult for a traditional IT department within an organization to keep abreast of threats and compatibility issues relating to mobile devices used by members of an organization. Accordingly, it may be desirable to outsource MDM tasks to third party vendors that can develop expertise in managing mobile devices. However, unlike management by a traditional IT department of networks containing only wired devices, managing mobile devices may not allow a party managing a device to have access to the physical device. Accordingly, deploying new applications or features to a device can be complicated. One common approach to this challenge is to require a user of a mobile device to manually download certain applications before allowing access to certain corporate resources. For example, an organization may require that a certain e-mail application be used by mobile device to access corporate e-mail.

However, this may be a cumbersome or obtrusive task, as inexperienced device users must navigate the download and installation process. Applications may need to be upgraded, which may require an invasive, manual update by the user or IT personnel. Furthermore, as organizations seek to add additional features to mobile device management, new applications may need to be separately download and installed. The installation process can be cumbersome and interfere with use of the device. For example, installing applications may require that the device restart after an old version of an application is uninstalled, a new version of the application is reinstalled, and the application is restarted. Furthermore, users may be slow to upgrade or install new applications if they are required to manually install them. This can make it difficult for an organization to timely rollout new applications or new security procedures. Rollout of new applications or updates may therefore be a time intensive process and may be difficult to coordinate within an organization.

This can cause organizations to avoid adding new or updating existing applications or features in an MDM platform, even though the organization may benefit from a more responsive approach to security or management policies.

SUMMARY

Applicants have recognized and appreciated that certain problems with the prior art can be solved by providing systems and methods to facilitate the deployment of software modules from a file server to agents on endpoints. Agents can contact a heartbeat server to receive information about a latest manifest file that identifies the software modules that should be installed on the endpoint. The agent can then determine from the manifest information whether new files need to be downloaded and automatically download them. A scripting engine can be used to allow run-time installation of modules without causing significant downtime of the endpoint. The scripting engine can utilize the agent to report back status and data from the software modules to allow modules to be used with a mobile device management platform.

One embodiment is directed to a method for deploying software modules using device management platform, including providing, at one or more server computers, a file server configured to host a plurality of feature modules, a module manager configured to maintain the plurality of feature modules, and a manifest server configured to maintain a plurality of manifests. Each manifest conveys the feature module components that at least one endpoint should have installed. The method further includes providing one or more agents to a plurality of endpoints for operating thereon, where the agents are configured to communicate with the one or more server computers to receive at least one manifest and subsequently receive a subset of the plurality of feature modules from the file server. An execution engine configured to execute a plurality of scripts contained in the feature modules is provided to endpoint computers for operating thereon. The agents are configured to facilitate reporting of data from the feature modules to the one or more servers.

One aspect of some embodiments can include providing a web-based portal that allows a user to deploy the subset of feature modules to the endpoint computers. Another aspect of some embodiments can include providing at one or more servers, a heartbeat server configured to receive requests for updates from the plurality of endpoint on a periodic basis. The heartbeat server can be further configured to identify a manifest in response to the requests, when the heartbeat server determines that an endpoint sending a request has not yet received the latest manifest. In another aspect of some embodiments, the module manager can be configured to allow third parties to upload feature modules that can be deployed to the plurality of endpoints using the agents. In another aspect of some embodiments, the agents can be configured to download one or more manifests pertaining to a respective endpoint from the file server. In yet another aspect of some embodiments, the file server can be hosted by a content delivery network. In still another aspect of some embodiments, the agents can be further configured to associate an identification of the sending endpoint with the reported data from the feature modules. A further aspect of some embodiments can include providing at the server computers, a data store that allows aggregation of data from a plurality of feature modules associated with an individual endpoint. In a further aspect of some embodiments, the data reported can include at least an indication of the status of the deployment of at least one feature module.

Another embodiment is directed to a software agent stored in non-transitory computer memory comprising software instructions configured to execute on an endpoint and carry out steps of connecting to a heartbeat server at a regular interval to determine whether an updated manifest is available, wherein the manifest identifies a plurality of modules for the agent to install on an endpoint, and downloading a manifest from a file server, in response to an indication that a new manifest is available. The method further includes downloading, in response to the contents of the manifest, a plurality of files relating to the plurality of modules, providing the plurality of files to a scripting engine for execution, and providing messaging services to allow the plurality of modules to report data back to a device management server.

In one aspect of some embodiments, the agent can be configured to provide the plurality of files to the scripting engine and begin execution of the plurality of modules without requiring the endpoint to restart. In another aspect of some embodiments, the agent can be configured to communicate with the heartbeat server and the device management server using SSL encrypted communication. In yet another aspect of some embodiments, the step of providing messaging services can include an identifier that associates the data from the plurality of data with the endpoint. In still another aspect of some embodiments, the step of providing messaging services can include aggregating data from at least two of the plurality of modules and sending the data to the device management server according to a priority indicated by the at least two modules. In a further aspect of some embodiments, the steps can further include determining which files to download based on an applicability clause contained in the manifest.

Another embodiment is directed to a system for providing modules to a plurality of endpoints, having software instructions stored on non-transitory computer memory on at least one server, wherein the software instructions include a file server configured to host a plurality of feature modules, a module manager configured to maintain the plurality of feature modules, and a manifest server configured to maintain a plurality of manifests, wherein each manifest conveys the feature module components that at least one endpoint should have installed. The software instructions further include a heartbeat server configured to receive requests from a plurality of agents, wherein each agent operates on an endpoint, and to convey information about at least one latest manifest to each agent when that agent has not yet downloaded the latest manifest and an upload server configured to receive data from modules installed on each endpoint, wherein the modules include those modules identified in the latest manifest.

In one aspect of some embodiments, the upload server can be configured to provide the received data to device management software. In another aspect of some embodiments, the upload server can be configured to correlate the received data from a plurality of modules operating on an endpoint with the endpoint. In yet aspect of some embodiments, the manifest server can create a manifest in response to a request to deploy at least one feature module to a group of endpoints.

It should be appreciated that all combinations of the foregoing concepts and additional concepts discussed in greater detail below (provided that such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6A is a screenshot of an exemplary user interface for deploying feature modules;

FIG. 7 is an exemplary heartbeat response for use with some embodiments;

FIG. 9 is a flow chart of the exemplary use of a manifest manager in some embodiments;

FIG. 10 is an exemplary manifest file for use with some embodiments;

DETAILED DESCRIPTION OF EXEMPLARY EMBODIMENTS

Figure 1:
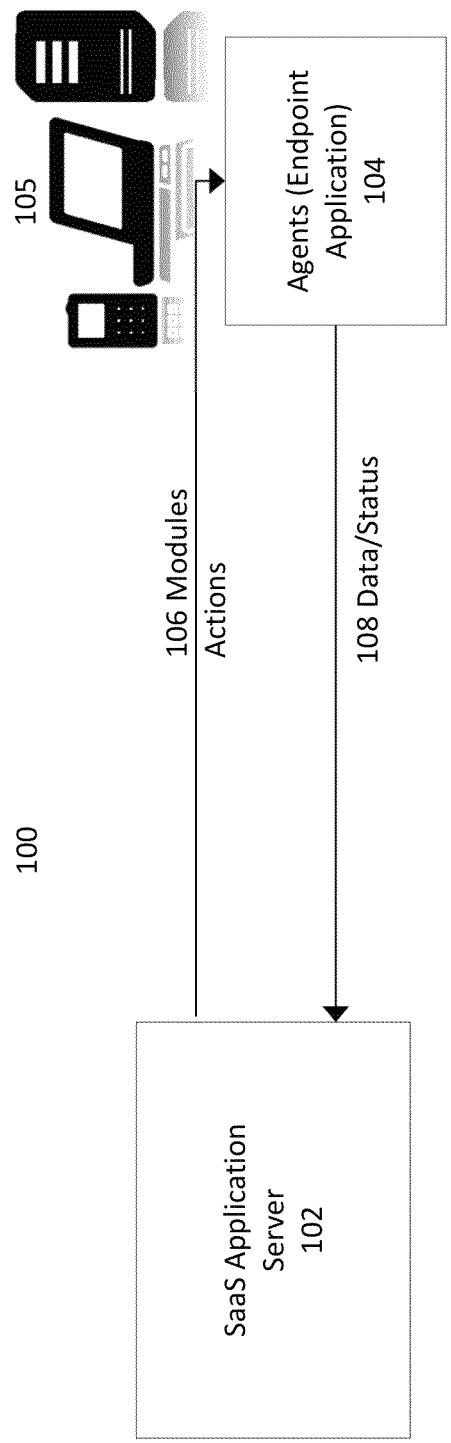
FIG. 1 is a system diagram of an exemplary MDM system for use with some embodiments.

In some embodiments of the present invention, deployment of applications and data to endpoints can be facilitated by a network-based solution. In some embodiments, a cloud-based approach is used. Agents can be installed on endpoint devices. These agents can facilitate installation of applications/feature modules on-demand. This can allow an organization to selectively add features and applications to endpoint devices without a complicated manual rollout. This can allow an organization select features for use with a mobile device management (MDM) platform to target the needs of an organization, and allow features to be added or removed as the needs of the organization change. When an MDM system is outsourced to a vendor, or is supplied by vendor, a simplified deployment and distribution approach to applications and features may allow the supplier or operator of the MDM system to offer flexible pricing that is tailored to the features used and the needs of an organization.

In addition to allowing customers of an MDM platform to selectively purchase and deploy features, in some embodiments, a user of MDM platform may be able to deploy third-party applications and feature packs or develop its own features and applications. The user of the MDM platform (e.g., the organization) can utilize embodiments disclosed herein to facilitate deployment and maintenance of any suitable applications and features. Accordingly, in some embodiments, the MDM platform can facilitate deployment and management of applications and features from one or many software vendors.

As used herein, a feature module is an executable application, script, or data pack that may be selectively deployed to one or many endpoints, providing a specific function in addition to the core functionality of the MDM system. A feature module may include the executable code and/or data necessary to implement a feature of an MDM platform. These can include new standalone applications or scripts, or may include functionality added to existing applications on an endpoint device or updates to these existing applications. Examples of feature modules include patch management for laptops, Exchange ActiveSync managers, Lotus Traveler managers, user visibility applications, such as applications utilizing Active Directory from Microsoft, etc. Other examples of feature modules include those disclosed throughout this application.

In some embodiments, feature modules may be supplied by the operator or vendor of the MDM platform. In some embodiments, feature modules may also be supplied by third party vendors or the user of the MDM platform itself. Feature modules may be applications, or modules added to existing MDM applications. In some embodiments, feature modules are additional applications that can be installed on an endpoint. Feature modules may communicate with components on a network, such as communicating with a server component to receive instructions from the MDM platform or to send information, such as status information about the endpoint device to the server, so that the MDM platform can analyze this information from the endpoint. In some embodiments, feature modules may also use the existing reporting and control channels provided by the MDM system and agents on the endpoint to facilitate visibility and management features provided by the feature module.

As used herein, a user of MDM platform is a customer organization that benefits from the use of an MDM platform. In many instances, the user of the MDM platform is an organization, such as a corporation or campus that includes corporate resources and has individuals within the organization that use endpoint devices.

As used herein, endpoint devices can include any endpoint devices suitable for accessing or interacting with corporate resources. This may include PCs, laptops, mobile devices, smart phones, tablets, network clients, or the like. Endpoints can be understood to have a processor, memory (which may include magnetic, optical, solid state, or remote memory) for storing data and instructions, and a communication circuit to allow communication with a network, either wirelessly or via a network cable. Modules and software components, such as agents, described herein may be stored in non-transient memory on the endpoint.

In some embodiments, feature modules can be used for any purpose. In some embodiments, these purposes include allowing security and management policies to be enforced on an endpoint device. In some embodiments, these purposes may include providing visibility information about devices to the MDM platform. In some embodiments, this can allow IT managers to gather and analyze information about the health of endpoint devices connecting to a corporate network and the overall health of the network itself. In some embodiments, feature modules may actively participate in controlling or providing access for endpoint devices to corporate resources, such as e-mail, documents, data, or the like. In some embodiments, feature modules may provide features unrelated to MDM, such as standalone applications that provide non-MDM features that are deployed to endpoints in an organization using the distribution and deployment functionality of the MDM platform.

Examples of security policies that may be used by the MDM system can include, but are not limited to: requiring users have a passcode to access their device, including defining the minimum passcode strength required; restricting access to devices that have been rooted or are running certain apps (e.g., blacklisted apps, such as file-sharing apps); requiring that the user run certain apps, such as security apps or access clients; remotely wiping the device back to factory settings or wiping a portion of data stored on the device when a device appears compromised, reported missing, or is substantially out of compliance; and limiting access of devices that run versions of a mobile OS or unsupported OS. It should be noted that limiting access can include preventing access, restricting access, changing the nature of the access, or providing access to certain resources, while limiting access to other resources, etc. Examples of resource management policies that may be used with the MDM system include, but are not limited to: alerting the user or an administrator; preventing email access from the device; restricting access to corporate Wi-Fi, VPN, etc.; restricting access to corporate documents on the device; removing all corporate content and configuration from the device; and removing all personal and corporate data and settings from the device.

While the exemplary MDM systems are described with respect to servers, it should be appreciated that the system can be implemented on a plurality of servers, including cloud-based systems which may deploy the system on a plurality of servers on a dynamic basis, allowing for greater scalability, or a single server that includes many or all of the features disclosed herein. In some embodiments, the servers described herein can be software modules executing on a common or shared server platform. Any suitable portion of the exemplary MDM systems can be executed on one or more processors, which may be separate from the processors executing other portions of the MDM system. A system may be implemented as part of the local IT infrastructure of a corporate environment or as part of a third party solution employed by the organization.

The components of an MDM system on a server and the feature modules can include software operating on one or more processors. This software can include software instructions, written in any suitable manner stored on non-transient computer readable media, such as optical, magnetic, solid-state memory devices, or local or remote storage. Computing devices, as described herein can be understood to have one or more processors, memory, and communication devices. Software components can be stored locally or remotely, and be stored in non-transient memory.

As used herein, a corporate network should be considered a term for any network used by an organization that includes resources, such as Exchange servers, that need to be configured behind a firewall. Generally, a corporate network will include at least one local area network that is used by the organization. This can include campus networks used by universities or other institutions or networks used by corporations or small businesses. The corporate network may be large or small, and some networks may be maintained by a local IT staff. A corporate network can further be composed of multiple networks that interact with shared corporate computing resources, such as BlackBerry Enterprise servers (BES). In some embodiments corporate networks are synonymous with customer premises. It should also be understood that references to corporate, corporations, organizations, etc., may be interchangeable and are not intended to be limited to commercial business organizations. While many of the embodiments described herein are described with reference to corporate environments, these embodiments are merely illustrative and can also apply to the computing environment of any organization that has a need for remote management of network resources.

Corporate resources can include any of the resources, such as servers, data, credentials, e-mail and exchange services that may be part of, or accessed by, the corporate network. Corporate resources can include those resources that may be ordinarily made available to users of endpoint devices when in compliance with security and management policies.

By using embodiments of the MDM system described herein, developers of feature modules may be able to develop modules in a development environment and deploy them using the deployment and distribution system of the MDM system when a customer wishes to have them installed on the endpoint devices she manages. To deploy a module, the module can be uploaded to the servers of the MDM platform. Notification of the new module can be conveyed to an agent running on the endpoint device. The agent may be a software component that is required by a corporate network for accessing corporate resources, or maybe a software component voluntarily or manually installed on endpoint devices. The agent can be responsible for communicating with MDM servers, including receiving notification that new or updated feature modules are available for download. Once downloaded to the endpoint, the feature module may be installed and executed by the endpoint.

By utilizing a modular approach, in some embodiments, the core software for providing MDM services to the endpoint can remain operational and unaffected by the deployed updates or modules. For example, deploying a module that updates features related to e-mail, may not require changes to other MDM features, such as reporting status information or maintaining security and compliance with policies on the endpoint. In some embodiments, modules may provide new features to supplement the operation of core MDM software on the endpoint. Utilizing a modular approach to features may allow an organization to deploy a core MDM component to all devices and then selectively add features to the device, using the deployment system described herein. Furthermore, this may allow an organization to begin with a baseline of MDM features and upgrade the features that the organization uses to meet its needs, without replacing the core MDM software. This can avoid problems that might be caused by changing components that previously worked properly.

In some embodiments, the feature module may be one or more scripts that can be interpreted by software running on the endpoint. This software may be part of the agent or may be a software module associated or in communication with the agent. This may allow the agent to download new or updated feature modules, while a scripting engine interprets these new modules. In some embodiments, feature modules may be executed/interpreted or updated without requiring the entire endpoint device or all of the MDM components on that device to be restarted. This can provide several advantages.

First, in embodiments where the device need not be restarted, the end-user of the device may be unaware or not generally inconvenienced by updates. This can allow updates and new modules to be deployed to endpoint without the typical logistic headaches associated with traditional rollouts of software. For example, traditional rollouts may have required system down time, advance notice, restarting of devices on the network, and substantial testing before a rollout. In some embodiments, an update or new module can be deployed to endpoint devices at any time, without requiring system downtime, advance warning to users, or input from users. Second, in some embodiments where MDM components on the endpoint device need not be restarted, MDM components, such as agents or other feature modules, can continue to operate, allowing endpoint agents and management and security policies to continue to function normally during the update process. This can avoid security risks associated with disabling these MDM components. Furthermore, where updates are unobtrusive to the end-user, and where updates can frequently occur without greatly diminishing the user experience, the MDM system may provide advantages to developers of feature modules. For example, substantial beta testing of updates may not be required before deploying new or updated feature modules. In addition, an update can be provided to a group of endpoints and the group of endpoints can act as a real-world beta testing group for these updates. This may greatly reduce the amount of development time required for producing reliable, new or updated feature modules.

In some prior art systems, features in an MDM platform are provided by core components or by the agents themselves, without using a modular approach. This often required that the agents or core components be removed and replaced whenever an update was needed. Furthermore, new features were difficult to add, because agents often required an update to the entire agent to implement the feature. This could result in down time or security holes during an update process. In some of these prior art systems, because the agent would be effectively replaced, each update may have been a risky installation. Once a deployment is fully operational and the existing features work, there may be impetus to avoid fixing what is not broken. As a result, customers may be less likely to rollout new features or update minor security holes in the MDM system. This can detract from the user experience because desired features may be overlooked, and may detract from the vendor experience because valuable features are not being deployed even where these features may be desirable to the vendor's customers.

Agents can be provided for downloading updates in a secure manner from any suitable server resources. For example, communication between agents on endpoints and servers can utilize encryption, such as by utilizing secure socket layer (SSL) or HTTPS communication. The agent can also authenticate any server involved in the delivery of feature modules. This can prevent attacks whereby untrusted servers provide malicious or unsecure feature modules that may leave an endpoint vulnerable. In some embodiments, encryption and authentication can also provide security to server resources by authenticating agents prior to allowing the agents access to modules. This may allow a vendor of an MDM system to prevent unauthorized access to features to require payment for these features. By providing an encrypted and authenticated system, agents and servers can operate confidently that the endpoints and servers are who they purport to be and are secure.

Agents may also communicate with more than one server. In some embodiments, a cloud-based approach is used, whereby agents can communicate with any number of servers on the Internet to deploy and manage feature modules. By using a cloud-based approach, an MDM system and the deployment and distribution system can be scaled to meet demand. For example, where a new update that broadly applies to a great number of endpoints is needed, a cloud-based content delivery system may be used to scale up to meet the temporary demand for the large number of downloads that are required to deploy the feature modules to all endpoints.

By providing a system whereby agents can communicate with one or more servers to deploy feature modules, the deployment process can be more easily outsourced. In some embodiments, the servers that the endpoint agents communicate with can be managed by a third-party or vendor that is different than the corporate customer of the MDM platform. This can remove headaches associated with traditional update processes whereby internal IT departments were responsible for rolling out updates. By outsourcing the use updates and the overall deployment process, an organization may not be required to manage server resources, saving cost on hardware and software, as well as allowing personnel (e.g., vendor personnel) with expertise to manage the server resources, without requiring the IT department of a customer to develop such expertise. In some embodiments, customers may not even be required to have an IT presence of their own, allowing the vendor to provide the MDM platform and manage endpoint devices using the MDM platform.

In some embodiments, third parties may use the same distribution platform as the organization that provides or benefits from the MDM platform. For example, a customer can contract with a vendor to provide core MDM services, allowing the customer organization access to the distribution system described herein and providing agents on endpoints relating to that customer's network. That customer organization can then create its own applications or contract with other parties to provide certain feature applications that may not be available from the MDM vendor. For example, an organization may wish to use a proprietary feature module that provides customized services to endpoint devices. The developer of those customized modules may utilize the distribution mechanisms described herein to deploy applications needed for the new feature. The developer of these new modules can upload the modules to the MDM system. The mechanisms described herein can then be used to convey that module to the agents on the endpoints and distribute the custom module in the same manner as any other feature module.

By providing a distribution system as part of the MDM platform, the MDM platform can be used to monitor the status of the distribution of new modules. In some embodiments, agents report back the status of new module deployments to the MDM platform, allowing a manager of the MDM platform to monitor, in substantially real-time, the status of deployment of any modules or updates to modules. This can allow the deployment and distribution platform to provide an end-to-end system for deploying feature modules. The administrator using the deployment and distribution system can control the entire lifecycle of the deployment for each endpoint device. The administrator may request that certain groups of devices have certain feature modules installed. Upon submission of the request to have these feature modules installed on the group of endpoint devices, the distribution and deployment system can deploy the applications and data necessary to the endpoint devices. The deployment and distribution system can then receive status information about deployment from agents on the endpoint and report back the status information to the administrator. In some embodiments, this information may be provided in a dashboard that allows an administrator to tell, at a glance, the status of installations of feature modules on a plurality of endpoint devices. In some embodiments, this status reporting can be ongoing, allowing an administrator to determine if a user has disabled or removed certain deployed feature modules.

An end-to-end system may be a desired feature for generic deployments unrelated to features of an MDM platform. Accordingly, in some embodiments, the distribution system may be used with generic feature modules, such as apps on a smart phone. The module need not be related to the agents in functionality, but the agents can report back status of the deployment to aid in deploying new applications to mobile devices, even where these applications are unrelated to status, security, or compliance. For example, an organization may wish to deploy a sales application to users of Android and iOS mobile devices, to aid them in following sales leads while in the field. In some embodiments, the organization may use the distribution system described herein to assist in rolling out installation of the application to its sales force.

In some embodiments, the distribution platform can take advantage of the MDM components on the endpoint device and allow modules to be distributed that include compliance policies for using the contents of the module. For example, where a feature module includes a sales application that can access sensitive sales information, the sales application may be sent along with a compliance policy that allows the user of the mobile device endpoint to only access the sales information while on a trusted network, such as a corporate network. In this way, while modules may be data or applications used for any suitable purpose, in some embodiments, the modules may take advantage of the MDM nature of the platform once they are deployed and executed. Furthermore, in some embodiments, in addition to the MDM system reporting the status of the installation process, the module can also be configured to gather and transmit information about the device using the MDM platform.

In some embodiments, the end-to-end deployment and reporting of installation status of feature modules can provide further advantages. For example, in some embodiments, the deployment process can be substantially automated using the deployment and distribution system. Once a request is submitted, the feature module will be deployed to a plurality of endpoints and the status of the deployment can be checked at any time by administrator. Furthermore, information about unexpected status of deployments, such as failed installations, can be reported to an administrator as an alert. Because the status of a device and the individual feature modules can be reported, an administrator may be able to monitor status of deployed modules, allowing less-tested modules to be freely distributed without traditional headaches associated with robustly testing modules. For example, an administrator may be able to recall and install feature modules from a plurality of devices if a bug is discovered. This can reduce the development cost of feature modules. Furthermore, because the deployment and distribution system may be used to deploy updates relatively easily, version maintenance of applications on the endpoints can be greatly simplified. An administrator may be able to quickly tell which endpoints are not running updated versions and use the deployment system to send updated versions to these noncompliant endpoints.

Exemplary Architecture

An exemplary embodiment of the architecture for a deployment and distribution includes agents on the endpoint devices provide certain features to the device. Server components on one or more servers interact with the agents on the devices. On the endpoint, an exemplary embodiment includes a file request manager, a module manager, and an endpoint core agent, which may include a module scripting engine and an upload manager. On the server side, server components include a module manager, a heartbeat server, a manifest server, a file server, an upload server, a message processor, and a plurality of module-specific message handlers.

Agents may facilitate execution of actions on an end point device. Actions can include commands or instructions that are sent to the endpoint for execution. Examples of action that may be sent to an end point and facilitated by an agent may include a set of scripts or executables asking the agent to install new software on an endpoint device or instructions to wipe the end point device. Agents may also facilitate collection of status information about endpoint devices. Status information may include device attributes about the computing environment of the endpoint device. Exemplary information reported may include the model or hardware information about the device, operating system information, such as version and identity of applications installed, and current network attributes, such as an IP address.

FIG. 1 shows a high level architecture of the deployment and distribution system as part of an MDM platform. System 100 contains server components and endpoint components. An application server 102 provides server functionality as described herein. This application server can be a SaaS application server providing server functionality in a cloud-based approach, which include a plurality of servers hosting the application or components thereof. Agents 104 on endpoints 105 provide core MDM functionality including allowing actions to be executed on the endpoints and allowing data and status information to be returned to the server. Agents 104 can include a plurality of endpoint applications that provide agent functionality. SaaS application server 102 may transmit actions and modules across a link 106, which may traverse a network, such as the Internet. Agents 104 may receive these modules and actions and install modules or execute actions accordingly. Agents 104 can also transmit data to the application server across link 108 which may also traverse a network, such as the Internet. This allows agents to report back status of deployments and data collected or generated by the deployed feature modules to application server 102.

Embodiments disclosed herein are illustrated with agents that are already installed on endpoint devices. These agents may be previously installed using any suitable means. For example, a user may manually install an agent or have an IT administrator for corporate network install the agent. In some embodiments, users of a mobile device can be directed to a URL for downloading an agent prior to registering with the MDM platform or a corporate network. The URL may allow the user to download and install agent components easily. Once installed, these agents can facilitate MDM functionality and participate in distribution and deployment of feature modules.

Figure 2:
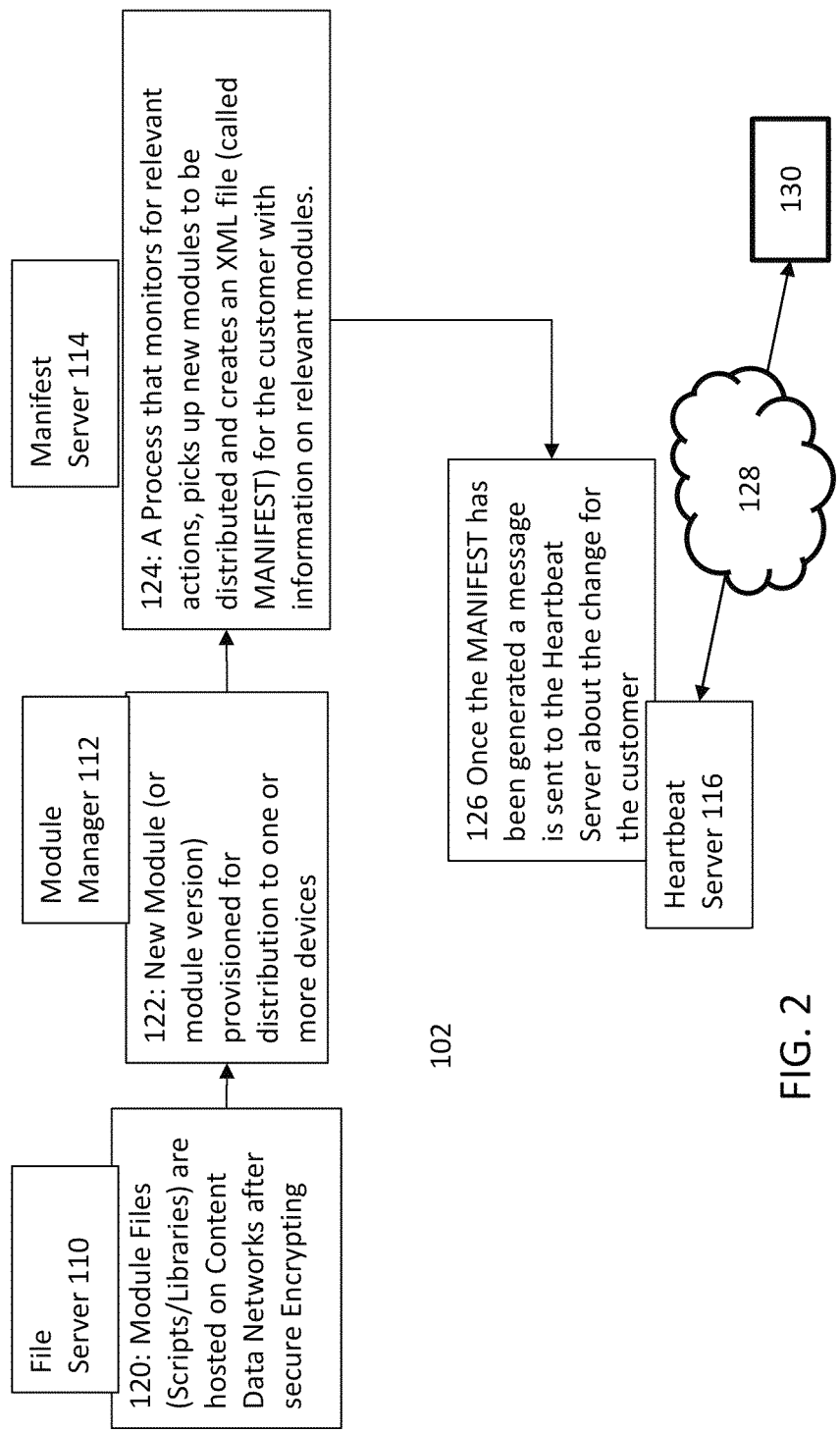
FIG. 2 is a system and flow diagram of exemplary server components for deploying feature modules to endpoint devices.

FIG. 2 depicts the server components for facilitating deployment and distribution of feature modules. FIG. 2 illustrates the various server components and the steps that they perform to facilitate distribution of features. File server 110 acts as a repository to store the data/code components that comprise the feature modules. File server 110 allows modules to be elevated to the server infrastructure and later downloaded by agents on endpoints. In some embodiments, file server 110 may be part of a content distribution network (CDN), such as a vendor network (e.g., Akamai). File server 110 may use a cloud-based approach allowing mirroring and dynamic load balancing to facilitate upload and download of module content. Files stored on file server 110 can include the data and instructions that constitute a feature module.

Server 102 also includes module manager 112. Module manager 112 can be a software component that keeps track of all modules and their components as they are uploaded and maintained. Module manager 112 can map the locations (e.g., URLs or other network locations) of these components. In some embodiments, it may also participate in determining which endpoints should receive feature modules that are uploaded to file server 110, while in other embodiments, this aspect may be handled by manifest server 114. In some embodiments, by separating module manager 112 and manifest server 114 from file server 110, greater scalability can be achieved. File server 110 can be an off-the-shelf CDN component, while module manager 112 and manifest server 114 can be specialized software components developed to facilitate the deployment and distribution system of an MDM platform. In some embodiments module manager 112 can facilitate maintaining modules on a multitenant database. Multiple customers can share server resources for an MDM platform. Module manager 112 can include different or shared modules for different customers and or groups. Module manager 112 can also keep track of multiple versions of modules to assist in operating endpoints to new versions of modules. In some embodiments, multiple versions of a module can be used to allow a select group of endpoints to participate in a beta test of updated versions of a module.

In some embodiments, module manager 112 and/or manifest server 114 can provide a simplified mechanism for pushing out existing modules to endpoints. An administrator may request that an update be sent to managed endpoints. The module manager can identify the components of the module and the location of these components, as well as identify which groups of devices may be authorized to access these components. The module manager can provide this information to the manifest server in response to a request from manifest server 114, or may push this information to manifest server 114.

Manifest server 114 manages pushing updates to endpoints by creating manifests that associate modules to be distributed to the endpoints with the groups of endpoints to receive the modules. Manifests can be small files that can be easily distributed to endpoints. A manifest can associate the locations of module components with an identification of the group of endpoints that should receive the update. In some embodiments, the agent makes the decision of whether each individual endpoint belongs to that group, allowing greater scalability, as the manifest server 114 may not need identify the individual endpoints to receive the update. In other embodiments, the manifest may identify the specific endpoints to receive a module. In some embodiments, a manifest is a file that has XML or metadata that identifies the locations of the components of modules to install and the attributes of a group of endpoints (or the individual endpoints) for which the modules should be installed. Endpoints can work with heartbeat server 116 to determine which manifests apply to each endpoint. Manifests may also include any security credentials, such as encryption keys, necessary for an endpoint to access the module components. Manifests can be distributed to agents across the network in a secure manner to protect these credentials. Manifests may also include a timestamp identifying the last change to the manifest or creation date and time.

When a manifest server has created a new manifest, it may upload the manifest to file server 110 to allow agents to subsequently download the manifest. In addition, manifest server 114 will inform heartbeat server 116 of the new manifest, and provide the timestamp of the manifest and, in some embodiments, decryption credentials to allow an agent to decrypt encrypted manifest stored on the file server. AES encryption may be used.

Heartbeat server 116 provides an interface from the server components to the agents 104 (and specifically file request manager 130, within each agent) across the network 128, which may include the Internet. In some embodiments, heartbeat server 116 uses a lightweight protocol, whereby each time an agent checks in with the heartbeat server (which may be at a regular interval, such as every 15 minutes) the heartbeat server will identify any manifests that may relate to the endpoint and/or identify a timestamp of the last change to that manifest. The agent may keep track of the manifest or manifests that it has utilized in the past and compare the timestamps of the past manifest to determine if a new manifest is waiting. In some embodiments, the heartbeat server reports the timestamp or ID of the last manifest to the agent, allowing the agent to make the determination of whether a new manifest should be downloaded.

It should be noted that in some embodiments, most times an agent checks with the heartbeat server 116, the timestamps or IDs will match, because updates may be less frequent than the requests for manifest information by agents (called heartbeats). By supplying timestamps, the heartbeat server can inform agents of new or updated manifests without needing to itself know the status of modules on the endpoint. This may allow greater scalability, as a heartbeat server may service many thousands of endpoints on a regular, periodic basis (e.g., agents check in every 10 minutes).

In some embodiments, when an agent identifies a new manifest based on the timestamp information received from heartbeat server 116, that agent can then go to the file server or CDN to request the actual manifest. This allows the bandwidth intensive operation of sending manifests to endpoints to be offloaded from the heartbeat server, allowing greater scalability. The information provided from the heartbeat server can include the URL of the manifest, the timestamp of the manifest, and any include decryption keys needed to access that manifest. This allows the manifests to be stored in an encrypted form allowing secure transport to agents across the Internet.

FIG. 2 also depicts the steps used in uploading and distributing new modules. Steps 120 through 126 are carried out by respective components 110 through 116. At step 120, module files, including scripts, libraries, data, or other code components are uploaded to a file server 110. This can include uploading to a CDN. These components may be encrypted. At step 122 when a module is created (or an update or new version is created), module manager 112 will provision the new module by associating the various components and identifying the location of these components on the CDN. Module manager 112 can make this information available to manifest server 114. At step 124, manifest server 114 monitors requests to distribute modules. These requests may come from administrators explicitly or may be responsive to updates to existing modules as identified by module manager 112. Manifest server 114 then creates a manifest file that associates module files with groups of endpoints to receive the module. At step 126 once a manifest has been generated manifest server 114 informs heartbeat server 116. This informs the heartbeat server 116 that the timestamp of a manifest has changed. The next time relevant endpoints check in with the heartbeat server, heartbeat server 116 will inform these endpoints that a new manifest is waiting, allowing agents on these endpoints to seek out and download new module components.

The heartbeat server can respond to requests from agents on endpoints that request information at regular intervals. Heartbeat server can verify the identity of the client agent and formulate a response to the client that includes billing and device specific information. The request sent to the heartbeat server can, in an exemplary embodiment, include the following information:

FL-DEVICE-ID: the device id;
FL-BILLING-ID: the billing account associated with the endpoint;
FL-ACCESS-KEY: the unique access key generated for each device when it starts getting managed;
FL-LICENSE-KEY: the current active license key for MDM services; and
FL-TIMESTAMP: the timestamp of the last ping.

In this exemplary embodiment, the heartbeat server determines from the timestamp received from the endpoint whether information about a new manifest should be transmitted to the agent. FIG. 7 depicts an exemplary format for a response from the heartbeat server.

Figure 3:
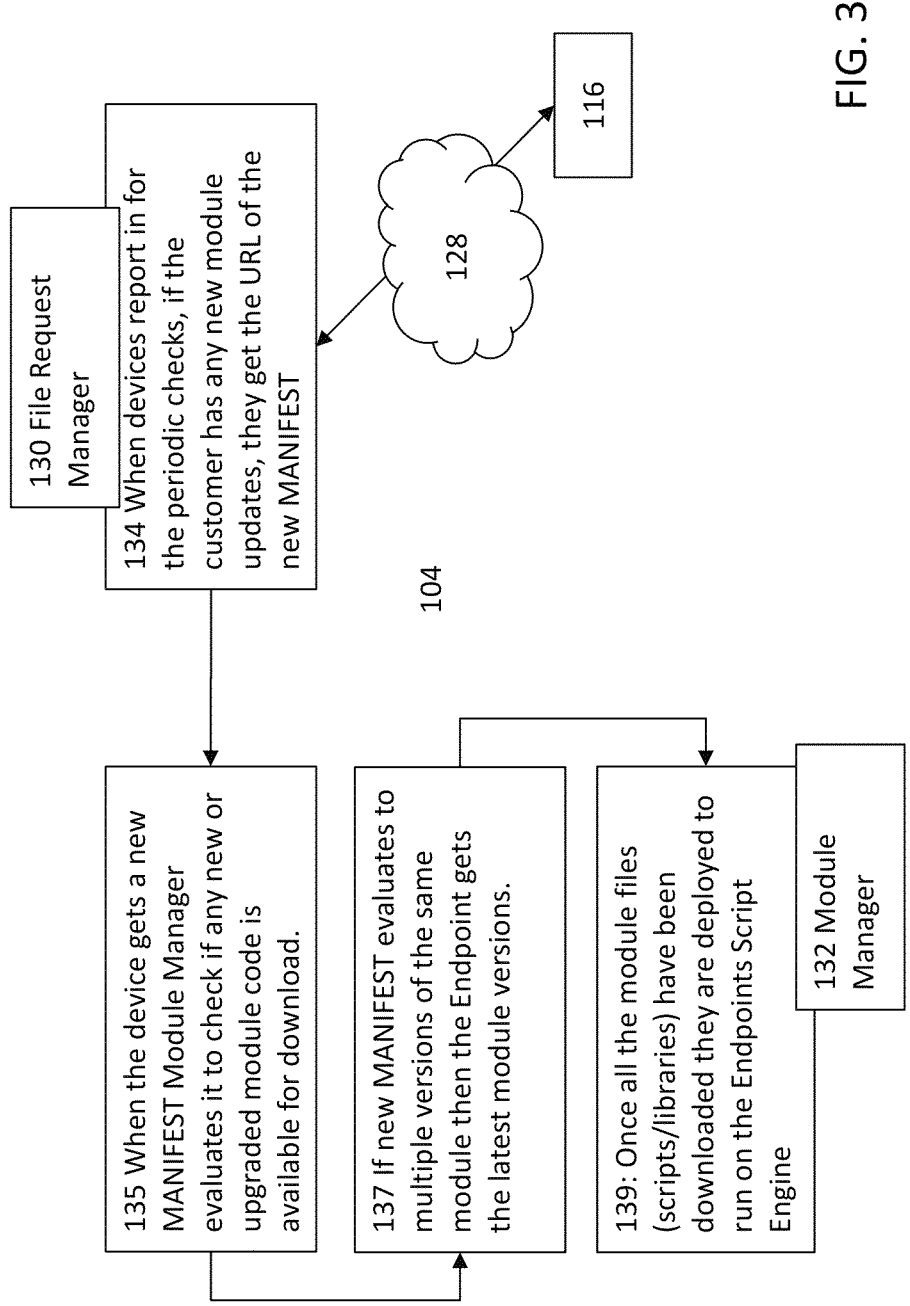
FIG. 3 is a system and flow diagram of exemplary client components for deploying feature modules to endpoint devices.

FIG. 3 depicts the components of an agent on an endpoint that facilitate distribution and appointment of feature modules. It should be appreciated that agents may include other components related to the MDM platform which are not shown. File request manager 130 is responsible for communicating with heartbeat server 116 to determine whether new manifests are available. In some embodiments, agents periodically communicate with a heartbeat server for other MDM purposes, such as receiving information about configuration changes. File request manager 130 can be invoked to handle information about manifests waiting on the file server. In some embodiments, file request manager 130 will evaluate the timestamp of the manifest, as identified by the heartbeat server, to determine if new content is available or be explicitly told by the heartbeat response that a new manifest is waiting. If new content is available, file request manager 130 will report this information to module manager 132. In some embodiments, the file request server will also request the files from the file server.

Module manager 132 resides on the agent and is responsible for managing the components of feature modules. In some embodiments, in response to a new timestamp on the manifest, module manager 132 can reach out to file server 110 to download and decrypt the waiting manifest. In some embodiments, the module manager can receive the new manifest from file request manager 130. Module manager 132 can then evaluate the contents of the manifest.

In some embodiments, a manifest includes a list of all modules that should be installed on the endpoint. Module manager 132 can determine whether any of the components listed in the manifest are different than the components already stored on the endpoint. For example, where a manifest identifies several modules, a new manifest may identify only a few modules that are not already on the endpoint. In some embodiments, a manifest can include a hash or version information of the contents of a module component to allow module manager 132 to determine if the content is the same as that is already installed. In some embodiments, this hash information can be provided by the file server.

In response to a changed module component identified in the manifest, module manager 132 can communicate with file server 110 across a network, such as Internet, to download these modules and utilize encryption keys stored in the manifest to decrypt the contents. In some embodiments, module manager 132 may need to negotiate with file server 110 to determine which module content has changed and should be downloaded, while in others, this information is provided in the manifest. In some embodiments, module manager 132 only downloads changed content to save on network bandwidth, allowing file server 110 to be more scalable and to reduce the overhead data used by each endpoint.

Once all module components have been downloaded, module manager 132 can forward the updated module to a scripting engine on the endpoint to allow the module to be installed and executed.

FIG. 3 also depicts a flowchart of the steps for deploying a module on an endpoint. Step 134 is carried out by file request manager 130. Steps 135-139 are carried out by module manager 132. At step 134 file request manager 130 receives timestamps associated with manifests during a heartbeat communication. If the timestamp does not match the timestamp of the last manifest, file request manager 130 can invoke module manager 132 to handle the new manifest. At step 135, the module manager 132 utilizes the encryption key from the heartbeat communication and the URL of the new manifest to download the new manifest from a file server. Module manager 132 then evaluates the content of the manifest to determine if any modules identified in the manifest apply to this endpoint. If so, at step 137, the module manager determines whether any of these module components have not already been installed on the endpoint. An SHA or MD5 hash of the contents of the module can be provided in the manifest allowing module manager 132 to compare the contents of the module against those already installed in the endpoint. In some embodiments, modules have associated timestamps that can also be compared. Similarly, in some embodiments, version information can be provided in the manifest to allow module manager 132 to evaluate whether the latest version is been downloaded.

At step 139, module manager 132 downloads all module files that are not already installed or whose version or hash information conflict with files already stored on the endpoint. Once this download has been completed, a complete module image has been stored on the endpoint and can be released to a scripting engine for installation and execution of the new/updated feature module.

In some embodiments, the manifest can also be used to remove modules. In some embodiments, a manifest is a complete list of all modules that should be installed on an endpoint. This can be conveyed either through a single manifest for an organization that allows agents to identify the group to which the receiving endpoints belongs, allowing different endpoints within an organization to have different modules, or through a manifest file that includes only the modules that should be installed on the receiving endpoint. The manifest can include specific instructions to delete modules, or may simply exclude modules that are no longer to be used. The module manager can respond to this information by removing any modules that are not identified in the manifest. This can provide a simple way of controlling the modules that are used by a given endpoint.

In some embodiments, once the module manager has downloaded all components, it can instruct the scripting engine that carries out the scripts in modules to temporarily shut down or restart, allowing the new image of modules to be loaded into the scripting engine. In some embodiments, the scripting engine will only be halted or restarted with respect to modules that have been updated. This can allow certain functionality to continue even during the restarting process. It should be noted, that this restarting process can be minimally invasive, without requiring restarting of the endpoint device. In some embodiments, the user of the endpoint device may not even be aware of the update to its modules and the loading and restarting of the scripting engine can be a background process. This can allow real-time updates to modules.

Figure 4:
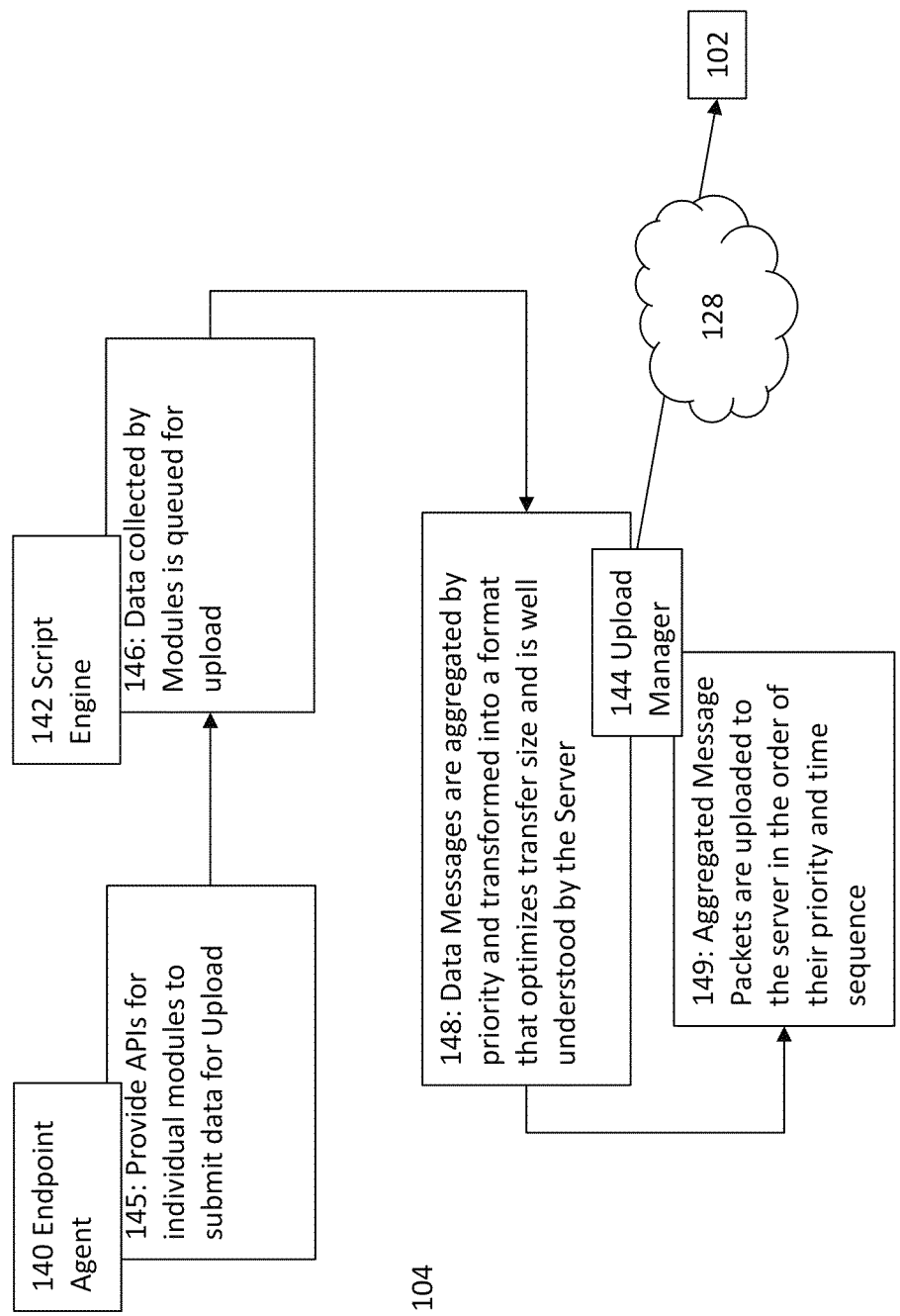
FIG. 4 is a system and flow diagram of exemplary client components for reporting status and/or data from feature modules.

FIG. 4 depicts the end point components of a reporting system that can be used as part of the module distribution and deployment system. Reporting component can allow deployed modules to report back status related to their installation as well as report back information to server components during normal execution. This can allow developers of modules to take advantage of APIs as part of the MDM platform that allow reporting of information gathered by modules. For example, modules may be developed that determine status information about an endpoint, apply compliance policies to an endpoint, apply configuration to an endpoint, facilitate access of an endpoint to corporate resources, etc. The MDM platform can be utilized to facilitate many of these functions allowing modules to easily report back data or status information to the MDM platform. In some embodiments, modules may take advantage of these mechanisms during normal operation of the feature module, while in other embodiments certain feature modules may utilize the reporting mechanisms shown in FIGS. 4-5 to report back installation status, allowing feature modules include generic applications that may or may not be related to MDM functionality. In some embodiments, feature modules may wrap basic reporting features around non-MDM applications to allow basic reporting of status of the nation and installation to server components. For example, where a non-MDM feature module is deployed, such as a sales application, the feature module used to deploy this sales application can include basic reporting functionality that utilizes the APIs of MDM agents on the endpoints to report back successful installation or other status information about the application. Data reported back can include any data that the module is configured to report.

As part of the method for reporting back data or status information from module components, the messages can include identifier information for associating the module data with a particular endpoint or agent. This can allow data to be correlated at the server, across a plurality of feature modules. For example, multiple feature modules may report back status or information a device. By collecting and correlating the data returned by multiple modules, the server can present a more complete holistic view of devices to a user of the MDM platform, allowing data from multiple modules to be presented as part of a single device view. Similarly, it may allow compliance policies to be adapted at the server by deploying new modules to report back new kinds of data that may be desirable for consideration of compliance status.

Endpoint agent 140 provides APIs that allow modules to report information back to server components. Scripting engine 142 is responsible for executing the scripts that are contained in feature modules. As part of the execution process, modules may collect data, such as status information about the endpoint device or any other generic data that the module wishes to report back to a server component. The scripting engine 142 facilitates the collection of this data as it executes each script in the feature modules. In some embodiments, the scripting engine is a Lua interpreter, allowing simple or complex scripts to be easily developed to implement robust module functionality.

The scripting engine 142 passes this collected data to an upload manager. Each of these is a software component that resides on the endpoint and may be part of the agent. Upload manager 144 is responsible for aggregating, normalizing, formatting, or other processing of data prior to upload. Upload manager 144 then forms aggregated message packets that contain information gathered by a plurality of modules to be passed to the server across a network 128, such as the Internet, to server components on server 102. These packets can include one or more identifiers that associate the collected data with the agent or endpoint. This allows server components of feature modules to correlate collected data with the endpoints and more easily share data with other applications or the MDM platform. This can allow reporting of data from endpoints to be used for various purposes on the server by applications, policies, or for visibility provided to a dashboard or for other viewing by an administrator using the MDM platform.

FIG. 4 also shows the steps involved in passing data from feature modules executing on and points to the server. At step 145 endpoint agent 140 provides APIs that can be accessed by a developer of a feature module to pass data from the endpoint to server. By invoking these APIs, at step 146, the feature modules executing in the scripting engine can collect data and command the scripting engine to report data back to server.

At step 148, upload manager 144 aggregates data collected by modules executing on the scripting engine and prepares it for upload. In some embodiments, this can include aggregating, identifying higher priority messages, reformatting messages to optimize transfer, compressing data, etc. At step 148, aggregated message packets are formed from the data queued for upload by the scripting engine. These message packets are then queued by priority to facilitate transfer to the server. Subsequently, upload manager 144 passes these messages across the network 128 to server components on servers 102 using a secure connection, such as HTTPS. In some embodiments, upload manager 144, as part of the aggregation process, authenticates the modules reporting the data. This can provide an additional layer of security to prevent untrusted modules from reporting data back to servers 102. This authentication process can utilize any suitable authentication technique as is known in the art. Similarly, upload manager 144 can authenticate servers 102 prior to transmitting data across network 128 to ensure that data collected by modules on an endpoint is not reported to untrusted entities. The upload manager can also receive confirmation from the server that the data has been successfully uploaded.

Figure 5:
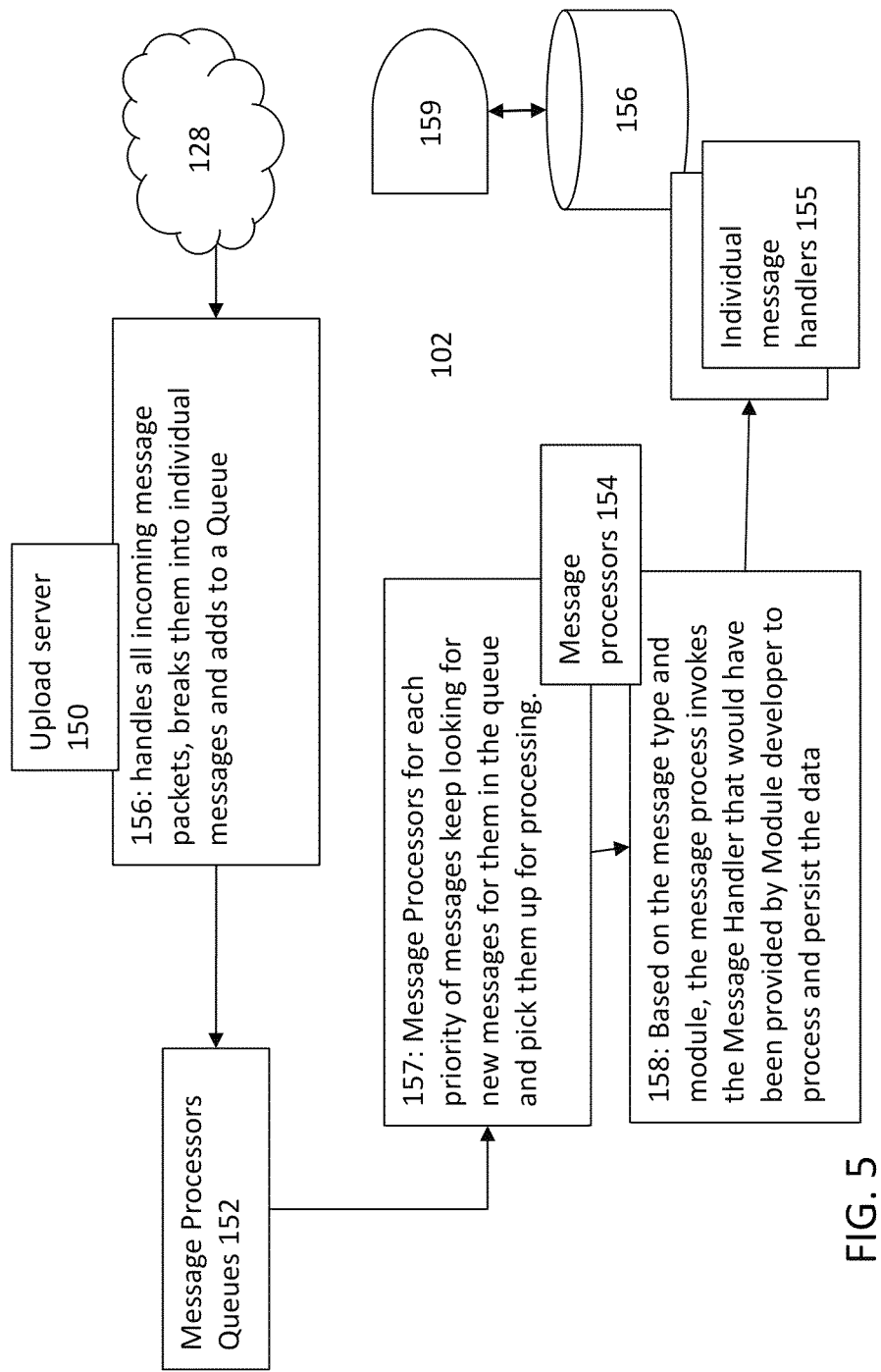
FIG. 5 is a system and flow diagram of exemplary server components for collecting status and/or data from feature modules.

FIG. 5 shows the corresponding components on the server for receiving messages from modules on endpoints. Messages from the upload manager can be received across a network 128 by upload server 150. Upload server 150 can be a software module running on cloud-based server infrastructure that handles incoming messages from a plurality of upload managers executing on a plurality of endpoints. Upload server 150 handles incoming message packets from the upload managers, breaks them into individual messages and adds them to queues 152. Message processor queues 152 can include a plurality of queues that can be handled by a plurality of message processors 154. Message processor queues 152 can include various queues for different priorities and types of data uploaded by the upload managers.

Message processors 154 check message processor queues 152 to determine that new data has been uploaded. Message processors 154 then handle these messages based on priority and begin processing this data. Message processors 154 determine the type of message received and the identity of the modules that sent the data. Message processors 154 may also determine the identity of the endpoints/agents that hosted the module. Message processors 154 determine which individual message handlers 155 should receive the uploaded data and then parse out the appropriate data to send to the appropriate message handlers. Individual message handlers 155 can include customized message handlers that have been developed as a server component for feature modules that have been installed on endpoints. For example, where a feature module has been developed to send back status information about e-mail applications, individual message handlers 155 can be correspondingly developed to receive e-mail status information and report it to a visibility dashboard as part of MDM platform. It should be appreciated that individual message handlers 155 may include software components that perform any suitable task with the messages received. These can be customized based on the individual feature modules deployed. In some embodiments individual message handlers 155 are developed simultaneously with the individual feature modules to provide rich module functionality. In some embodiments, individual message handlers 155 may be provided by third parties that develop third-party feature modules.

Message handlers 155 or message processors 154 can also store the data from the messages in a shared data store 156 (which may store the uploaded data in native or processed form). When stored, the information can be associated with the individual endpoints that sent the data, allowing the data pertaining to a single endpoint to be gathered from a group of feature modules (which may be unrelated or related) and shared and accessed by an administrator or MDM application. This can allow feature modules to add features to existing MDM applications. The shared data store can allow a plurality of applications on the server side to access and mine the data returned. This information be accessed by user interface 159, which can include a dashboard for viewing attributes and data pertaining to groups or individual devices. This interface may be presented to a user via a webpage, allowing an administrator to application server 102 via a browser and manage endpoints and view information about them that is received from feature modules.

FIG. 5 also shows a flowchart for the handling of incoming messages at server. At step 156, messages received by upload server 150 can be parsed into individual data messages from the packets and placed into message processor queues 152 according to priority. At step 157 message processors running on the server can read the messages that have been placed in the message processor queues 152. Message processors 154 will continue polling these queues on a regular basis as data may be arriving at any time. At step 158 message processors parse the messages, identify the appropriate message handler that should receive the message, and invoke the message handler if it has not already been invoked. These message handlers can be responsible for substantively processing this data and persisting this data on the server, such as aggregating and storing data reported from a plurality of modules on a plurality of endpoints to provide visibility services about these endpoints.

FIG. 6A shows an exemplary screen shot that would be presented to a developer when elevating a module to the server for deploying a feature module to endpoint devices. This dashboard allows the administrator or developer to define to configure the module for deployment. Information added using this screen can be handled by the manifest server and module manager. The interface allows selection of a code name, as well as a name for the module to be deployed. The developer can also select a category and product bundle to associate with the module. This can allow modules to be bundled so that they can be deployed together, allowing a simplified pricing and rollout strategy to be used when deploying modules to customers. The developer can select a version and define SQL or XML statements that should be included in a manifest when the module is deployed to endpoints. Once a module is uploaded, the information input can be used to create the manifest once a bundle or module is selected for deployment to endpoints.

Figures 6B, 8:
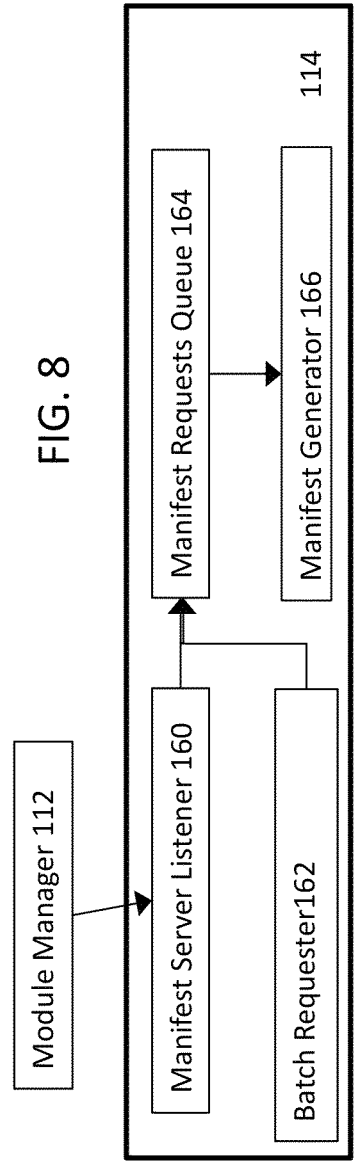
FIG. 6B is a screenshot of an exemplary user interface for deploying feature modules.
FIG. 8 is a block diagram of an exemplary manifest manager for use with some embodiments.

FIG. 6B is an exemplary portion of a screenshot that would be presented for managing a plurality of modules. As shown in FIG. 6B, a plurality of modules have been created and uploaded to the server infrastructure. This table reflects the information that can be stored by the module manager to facilitate deployment of these modules.

Examples of modules that could be uploaded using the interface in FIGS. 6A and 6B can include but are not limited to: base module for laptop management (e.g., a set of APIs for allowing management that can be presented to other modules); device visibility for laptops and computers (e.g., collecting hardware information and information about the running software and the operating system); patch management (e.g., verifying that certain patches have been applied); data protection (e.g., verifying that encryption and that peripheral memory devices are being monitored); endpoint security protection (e.g., verifying that firewalls and antivirus measures are being employed and that virus definitions are up to date); user authentication (e.g., verifying that a mobile device, such as a smart phone, requires a password); Exchange ActiveSync Manager (e.g., integrating with Active Directory); Lotus Traveler Manager; and BlackBerry Enterprise Server Manager. Custom modules can include, but are not limited to modules that help manage desktops, laptops, smart phones, tablets, or other mobile devices.

FIG. 7 depicts an exemplary XML response for conveying information about a manifest file from the heartbeat server to an endpoint agent once a new manifest is available, such as when a new module is ready to be deployed to the endpoints. Exemplary fields include a timestamp for the manifest, a license value, URLs to download new manifests, manifest file names and versions, keys for encryption and hash IDs for the manifest file, groups that correspond to the manifest (e.g., identifying the criteria for selecting and points for which the manifest applies), and identifications of users and groups for which the manifest may apply.

FIG. 8 shows the internal components of an exemplary manifest server 114. There are two primary ways by which a manifest can be created. First, if a module has been uploaded or updated, the module manager can inform the manifest server of the change so that the manifest server can propagate the change to any appropriate endpoints. Second, batch requests to deploy modules to devices can also be received. Examples of batch requests may include adding modules to devices where the module has already been uploaded into the file server, but the functionality is now being added to a new group of devices.

Manifest server listener 160 provides software means to receive requests from module manager 112 to update manifests when a module has been updated or has been uploaded for the first time. That is, changes to modules may prompt updated manifests for devices that should receive those updated modules (e.g., those that have older version of the module or those that are specified when the module is elevated to the server). Batch requester 162 provides a means by which the manifest server may listen to a user interface, such as a web based dashboard that allows an administrator to add functionality to groups of devices, and to push those changes in authorization of devices to the deployment and distribution system. In some embodiments, batch requester 162 will periodically check the authorizations of devices to determine if changes to the manifests for those devices need to occur.

Manifest server listener 160 and batch requester 162 begin the manifest creation process by placing manifest requests in the manifest request queue 164. Manifest generator 166 will observe manifest request queue 164 to determine if new manifests need to be created. For example, when an updated module results in a request from module manager 112 for a new manifest, manifest generated 166 may determine which groups of devices had previous versions of that module and determine that those devices should receive an updated manifest.

FIG. 9 shows the processing flow 170 for generating manifests for groups of devices using an exemplary manifest server. At step 172, the manifest server gets a list of modules and checks the criteria for determining availability of the module. Criteria can include a list of customer organizations that should receive the module based on payment authorization. At step 174, applicability clauses are generated for each of the modules. In some embodiments, an applicability clause is an identification of which types of devices should receive the module. In some instances, the applicability clause can identify whether a module is a beta module for limited distribution or a generally available module that is ready to be distributed to all endpoints within an organization. At step 176, for a module is that are for general availability, the manifest server gets details about the module files and the version information to prepare inclusion of that module to a general class of endpoint devices. At step 178, if a customer has access to beta modules and the modules in question are beta modules, the manifest server will obtain details about the module and prepare a manifest file that includes identification of the beta files. At step 179, one or more manifest files are generated and stored on the file server. The heartbeat server is made aware of the new manifests and it can begin informing the appropriate endpoint agents during the next heartbeat.

FIG. 10 shows an exemplary manifest file that may be retrieved by an agent in response to a notification from a heartbeat server. Once a new manifest file is discovered, the agent on the endpoint can go to the URL in the heartbeat response and request a new manifest from the file server or CDN. Using decryption keys received from the heartbeat server, the manifest file can be decrypted. Exemplary manifest file includes XML information allowing the agent on the endpoint to determine which files need to be retrieved from the file server to complete installation of a module. Manifest file may include a manifest version and license keys. Inclusion of license keys can allow a manifest file to easily distribute new license keys to agents on endpoints. This can allow an MDM platform to be implemented on a subscription basis or allow features to be turned on automatically using license keys. Once a customer upgrades this license status, new license keys can be distributed to agents on endpoints managed by a customer.

A manifest file also includes encryption keys, filenames, locations of files, checksums or hashes of the files, and other information to allow a module manager on the endpoint to determine which files it does not yet have, information on where to obtain the file, and how to decrypt these files. A manifest file can also include information about each module that should be installed, including the applicability clause of the module to allow each endpoint receiving the manifest to determine if it should install any beta module, if applicable. An applicability clause may also be used to identify which groups of endpoints within an organization should install which modules, in organizations that include a plurality of groups. Module IDs, names, versions, and expiration dates can also be included.

Figure 11:
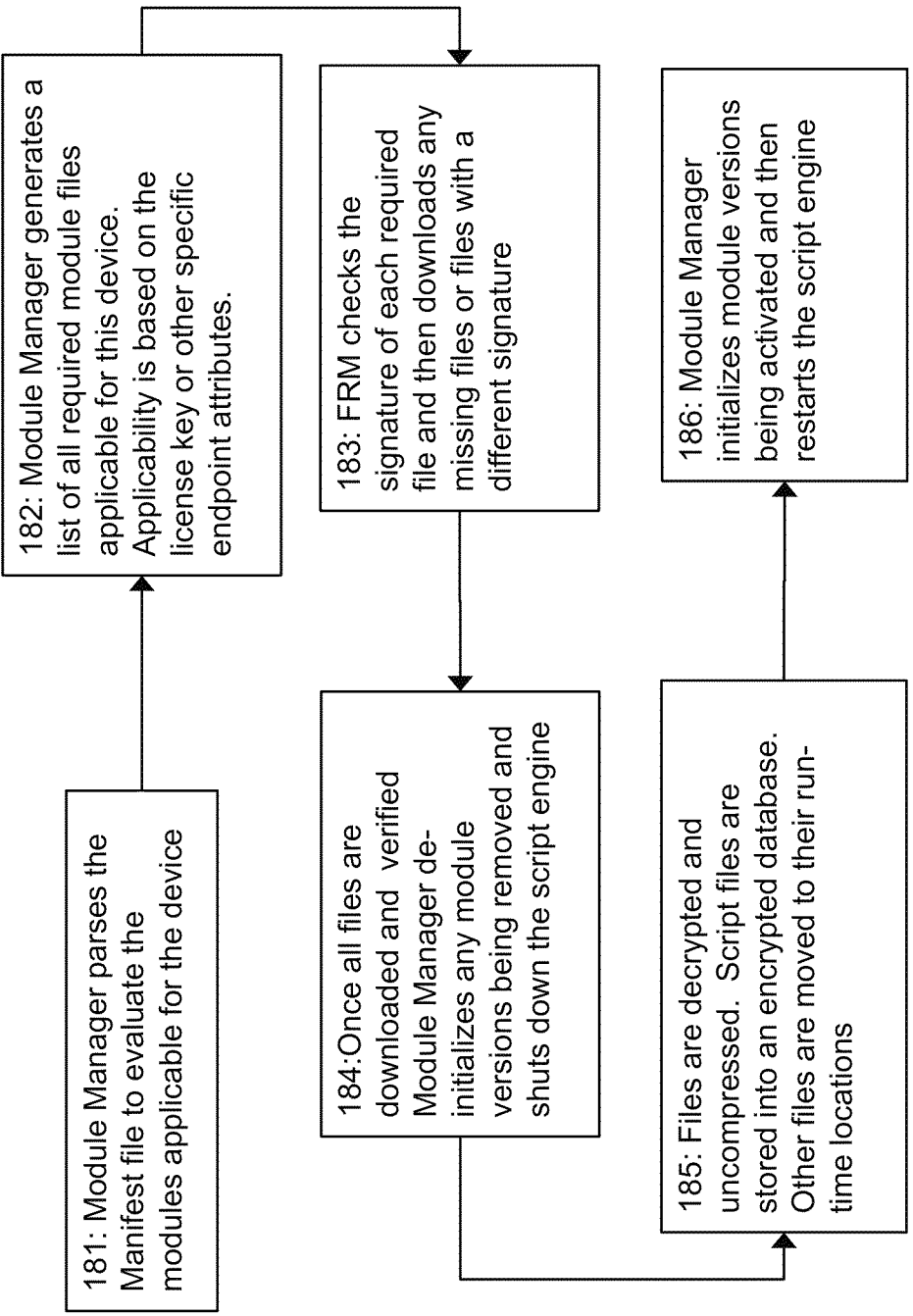
FIG. 11 is a flow chart of the exemplary use of a module manager on an endpoint in some embodiments.

FIG. 11 shows the detailed flow of the operation of a module manager on an endpoint agent. At step 181 the module manager receives and parses a manifest file to determine which modules are applicable for that endpoint device. This can include consideration of the applicability clause for each module to determine if the module applies to this endpoint. In some embodiments, a manifest file may include a manifest for all devices within an organization. While large groups of endpoint devices in an organization will share modules, there may be multiple groups. The manifest file can indicate which groups should receive which feature modules. The module manager can parse the manifest file to determine which modules apply to this device based on knowledge of the group to which the device belongs or based on specific identification in the manifest file.

At step 182, the module manager generates a list of all required module files that apply to the device. This applicability determination may be based on the license key associated with the endpoint device, attributes of the endpoint device that associate that device with a certain group, an explicit group ID of a group to which the endpoint belongs, etc. At step 183, the file request manager on the endpoint agent checks a signature of each required file identified in the manifest and then downloads any missing files or files with a different signature. Once the file request manager has downloaded all files and verified the authenticity these files, the module manager can work with the scripting engine to halt execution of any prior versions of the module being updated. Scripting engine can be shut down temporarily while old files are removed.

At step 185, files received from the file server are decrypted and uncompressed the script files or module can then be stored locally in an encrypted database and uncompressed form to allow the scripting engine to decrypt and execute these script files quickly, while ensuring security. Other files may also be moved to runtime locations to provide fast local access for execution of module components. At step 186, module manager initializes the new module version and restarts the scripting engine to allow the new module to begin providing normal functionality. In this manner, new modules can be updated or installed without requiring a substantial installation process or substantial downtime to mobile device. In some embodiments, the user device may not even be aware that updated modules have been installed and have begun executing.

Figure 12:
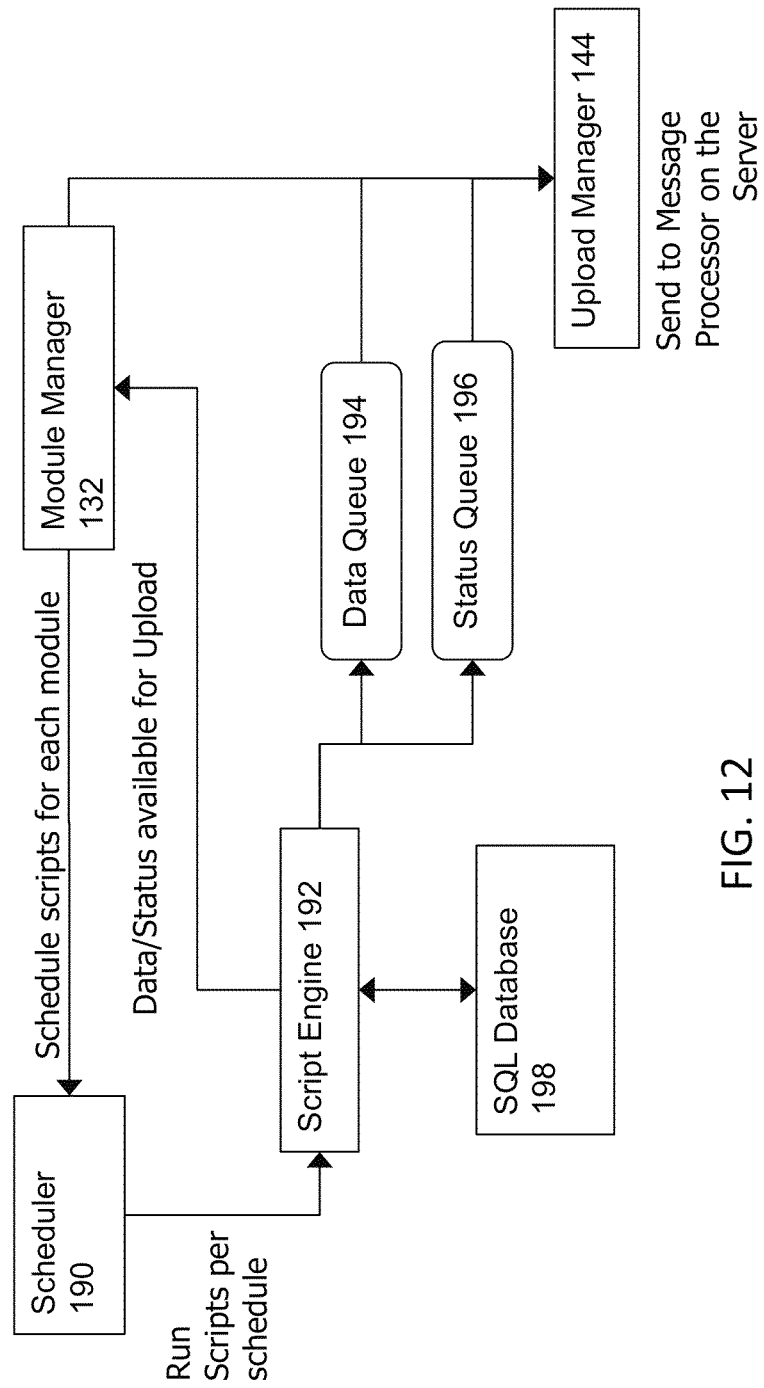
FIG. 12 is a flow chart of the exemplary use of a scripting engine on an endpoint for use with some embodiments.

FIG. 12 shows an exemplary architecture for the components responsible for execution of the scripts of a feature module for use with some embodiments. Scheduler 190 is a software module on the endpoint that determines, based on the metadata associated with a feature module, schedules execution of the scripts of a feature module. For example, metadata may identify the frequency with which to execute a script. Module manager 132 can configure the schedule of the feature module scripts based on the information it gathers when installing the feature module. Schedule 190 can schedule the script to execute on script engine 192. Script engine 192 can interpret and execute any scripts or other executables in the feature modules. To execute scripts, the script engine may access a SQL database that contains data and code related to the feature modules.

In response to executing instructions of the feature module, the script engine may gather status information about the endpoint and/or create data that should be shared with corresponding modules on the server. Script engine 192 may place this information in the status queue 196 and data queue 194, respectively. In some embodiments, the script engine may inform the module manager that the data is ready for upload. For example, in some embodiments, when a script is loaded for the first time, confirmation of installation may be provided to the status queue for upload to the server and the script engine may inform the module manager, as well. Upload manager 114 can access queues 194 and 196 to facilitate upload of status information and other data.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for deploying software modules using device management platform, comprising:
providing at one or more server computers,
a file server configured to host a plurality of feature modules,
a module manager configured to maintain the plurality of feature modules, and
a manifest server configured to maintain a plurality of manifests, wherein each manifest conveys the feature module components that at least one mobile device endpoint should have installed;
providing one or more agents to a plurality of mobile device endpoints for operating thereon, configured to communicate with the one or more server computers to receive at least one manifest and subsequently receive a subset of the plurality of feature modules from the file server; and
providing an execution engine to the plurality of mobile device endpoints for operating thereon, configured to execute a plurality of scripts contained in the feature modules,
wherein the one or more agents are further configured to facilitate reporting of data from the feature modules to the one or more servers.

2. The method of claim 1, further comprising:
providing a web-based portal that allows a user to deploy the subset of feature modules to the plurality of mobile device endpoints.

3. The method of claim 1, further comprising providing at the one or more servers, a heartbeat server configured to receive requests for updates from the plurality of mobile device endpoints on a periodic basis.

4. The method of claim 3, wherein the heartbeat server is further configured to identify a manifest in response to the requests, when a mobile device endpoint sending a request has not yet received the latest manifest.

5. The method of claim 1, wherein the module manager is configured to allow third parties to upload feature modules that can be deployed to the plurality of mobile device endpoints using the one or more agents.

6. The method of claim 1, wherein the one or more agents are configured to download one or more manifests pertaining to a respective mobile device endpoint from the file server.

7. The method of claim 1, wherein the file server is hosted by a content delivery network.

8. The method of claim 1, wherein the agents are further configured to associate an identification of the sending mobile device endpoint with the reported data from the feature modules.

9. The method of claim 1, further comprising providing at the one or more server computers, a data store that allows aggregation of data from a plurality of feature modules associated with an individual mobile device endpoint.

10. The method of claim 1, wherein the data reported includes at least an indication of the status of the deployment of at least one feature module.

11. A software agent stored in non-transitory computer memory comprising software instructions configured to execute on a mobile device endpoint and carry out the following steps:
connecting to a heartbeat server at a regular interval to determine whether an updated manifest is available, wherein the manifest identifies a plurality of modules for the agent to install on the mobile device endpoint;
downloading a manifest from a file server, in response to an indication that a new manifest is available;

downloading, in response to the contents of the manifest, a plurality of files relating to the plurality of modules;

providing the plurality of files to a scripting engine for execution; and providing messaging services to allow the plurality of modules to report data back to a device management server.

12. The software agent of claim 11, wherein the agent is configured to provide the plurality of files to the scripting engine and begin execution of the plurality of modules without requiring the mobile device endpoint to restart.

13. The software agent of claim 11, wherein the agent is configured to communicate with the heartbeat server and the device management server using SSL encrypted communication.

14. The software agent of claim 11, wherein the step of providing messaging services comprises including an identifier that associates the data from the plurality of data with the mobile device endpoint.

15. The software agent of claim 11, wherein the step of providing messaging services comprises aggregating data from at least two of the plurality of modules and sending the data to the device management server according to a priority indicated by the at least two modules.

16. The software agent of claim 11, wherein the steps further comprise determining which files to download based on an applicability clause contained in the manifest.

17. A system for providing modules to a plurality of mobile device endpoints, comprising software instructions stored on non-transitory computer memory on at least one server, wherein the software instructions comprise:

a file server configured to host a plurality of feature modules, a module manager configured to maintain the plurality of feature modules, a manifest server configured to maintain a plurality of manifests, wherein each manifest conveys the feature module components that at least one mobile device endpoint should have installed;

a heartbeat server configured to receive requests from a plurality of agents, wherein each agent operates on a mobile device endpoint, and to convey information about at least one latest manifest to each agent when that agent has not yet downloaded the latest manifest; and an upload server configured to receive data from modules installed on each mobile device endpoint, wherein the modules include those modules identified in the latest manifest.

18. The system of claim 17, wherein the upload server is configured to provide the received data to device management software.

19. The system of claim 17, wherein the upload server is configured to correlate the received data from a plurality of modules operating on a mobile device endpoint with the mobile device endpoint.

20. The system of claim 17, wherein the manifest server creates a manifest in response to a request to deploy at least one feature module to a group of mobile device endpoints.

* * * * *